(12) United States Patent
Shibata

(10) Patent No.: US 6,825,955 B1
(45) Date of Patent: Nov. 30, 2004

(54) METHOD AND APPARATUS FOR FACSIMILE THAT NOTIFIES AN E-MAIL TRANSMISSION USING FACSIMILE PROTOCOL

(75) Inventor: Hiroshi Shibata, Isehara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/204,017

(22) Filed: Dec. 1, 1998

(30) Foreign Application Priority Data

Dec. 1, 1997 (JP) .............................. 9-330437
Jun. 16, 1998 (JP) .......................... 10-168386

(51) Int. Cl.$^7$ ................................................ H04N 1/00
(52) U.S. Cl. ....................... 358/402; 358/401; 358/405; 358/407; 358/434; 379/100.06; 379/100.08; 379/100.12
(58) Field of Search ................................. 358/402, 400, 358/407, 403, 404, 405, 434; 379/100.01, 100.06, 100.08, 100.12; 709/206, 239

(56) References Cited

U.S. PATENT DOCUMENTS

| | | | | | |
|---|---|---|---|---|---|
| 5,339,156 A | * | 8/1994 | Ishii | ........................... | 358/400 |
| 5,608,786 A | * | 3/1997 | Gordon | ...................... | 379/100 |
| 5,619,725 A | * | 4/1997 | Gordon | ...................... | 395/839 |
| 5,754,306 A | * | 5/1998 | Taylor et al. | ............... | 358/400 |
| 5,848,137 A | * | 12/1998 | Hsiao | .................... | 379/110.01 |
| 5,859,967 A | * | 1/1999 | Kaufeld et al. | ............. | 395/186 |
| 5,905,777 A | * | 5/1999 | Foladare et al. | ......... | 379/90.01 |
| 6,020,980 A | * | 2/2000 | Freeman | ..................... | 358/402 |
| 6,043,902 A | * | 3/2000 | Sato | ............................ | 358/434 |
| 6,088,125 A | * | 7/2000 | Okada et al. | ............... | 358/405 |
| 6,134,582 A | * | 10/2000 | Kennedy | .................... | 709/206 |
| 6,144,462 A | * | 11/2000 | Kaplan | ....................... | 358/405 |
| 6,157,706 A | * | 12/2000 | Rachelson | ............. | 379/100.08 |
| 6,208,426 B1 | * | 3/2001 | Saito et al. | ................. | 358/1.15 |
| 6,230,189 B1 | * | 5/2001 | Sato et al. | .................. | 358/401 |
| 6,266,160 B1 | * | 7/2001 | Saito et al. | ................. | 358/407 |
| 6,268,926 B1 | * | 7/2001 | Okimoto et al. | ........... | 358/1.15 |
| 6,327,612 B1 | * | 12/2001 | Watanabe | ................... | 709/206 |

FOREIGN PATENT DOCUMENTS

| | | | | | |
|---|---|---|---|---|---|
| JP | | 7154418 | | 6/1995 | .......... G06F/13/00 |
| JP | | 71544118 | * | 6/1995 | .......... H04L/12/54 |
| JP | | 9198327 | * | 7/1997 | .......... G06F/13/00 |
| JP | | 10164345 | * | 6/1998 | ............ H04N/1/32 |

* cited by examiner

Primary Examiner—Kimberly Williams
Assistant Examiner—Tia A. Carter
(74) Attorney, Agent, or Firm—Cooper & Dunham LLP

(57) ABSTRACT

A facsimile apparatus which is capable of notifying a called facsimile terminal of an electronic mail transmission includes a facsimile image transmitter and receiver, a memory, an electronic mail generator, an electronic mail transmitter and receiver, and an electronic mail controller. The memory registers a plurality of facsimile terminals to be called and stores information sets pertinent thereto, wherein each of the information sets includes a user name, a facsimile number, and an electronic mail address for an Internet communication. The electronic mail generator generates electronic mail with an image file, addressed to one of the registered facsimile terminals using the electronic mail address thereof. The electronic mail transmitter and receiver transmits the electronic mail to an Internet server of a subscribing Internet service provider and receives electronic mail from the Internet server. The electronic mail controller controls the facsimile image transmitter and receiver to transmit electronic mail and to further transmit an electronic mail transmission notice to the same one of the registered facsimile terminals using the facsimile number thereof immediately after the electronic mail transmitter and receiver sends electronic mail to the Internet server.

43 Claims, 13 Drawing Sheets

Fig. 3

| LOCAL TERMINAL NUMBER (31) | USER NAME (32) | FACSIMILE NUMBER (33) | E-MAIL ADDRESS (34) | PROVIDER'S NUMBER (35) | E-MAIL INVALIDATING FLAG (36) |
|---|---|---|---|---|---|
| 1 | ABC | 06-1234-5678 | abcd@oooo.co.jp | 03-9999-9999 | 1 |
| 2 | DEF | | efgh@oooo.co.jp | 03-9999-9999 | 1 |
| 3 | GHI | 01-8765-4321 | ijkl@oooo.co.jp | 03-9999-9999 | 1 |
| 4 | JKL | 045-123-4567 | ijkl@oooo.co.jp | 03-9999-9999 | 0 |

30

```
Date:      January 1, 1997, AM10:10
From:      fax@oooo.co.jp
To:        abcd@oooo.co.jp
Subject:   Misc.
```
---
```
Attention: Mr. ABC From: XYZ Dear Mr. ABC, Please find an attached file.

* Time of Transmission:
         January 1, 1997, AM10:10

* A number of Pages:
         10 pages begin:
``` mn1.opq end.

EOM

40a

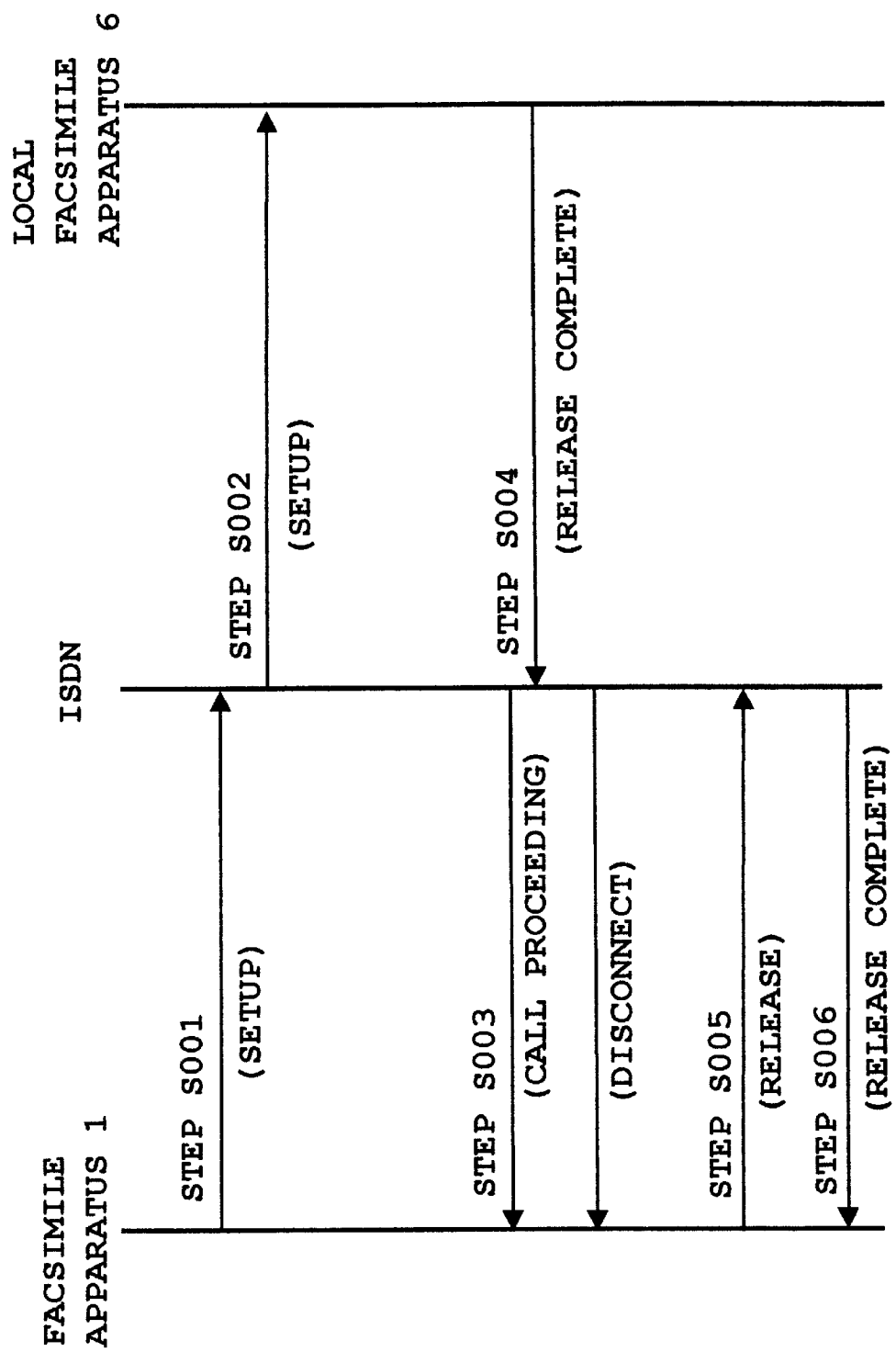

Fig. 6

| NOTICE TYPE | CALLING PARTY E-MAIL ADDRESS | CALLING PARTY FACSIMILE NUMBER | TRANSMISSION TIME |
|---|---|---|---|
| E-MAIL TRANSMISSION NOTICE | Fax@oooo.co.jp | 03-5555-5555 | 97/01/01, 10:10 |
| E-MAIL TRANSMISSION NOTICE ACK. | abcd@oooo.co.jp | 06-1234-5678 | 97/01/01, 10:10 |
| E-MAIL RECEIPT NOTICE | abcd@oooo.co.jp | 06-1234-5678 | 97/01/01, 11:10 |
| E-MAIL RECEIPT NOTICE ACK. | Fax@oooo.co.jp | 03-5555-5555 | 97/01/01, 11:10 |
| E-MAIL RECEIVING ERROR NOTICE | abcd@oooo.co.jp | 06-1234-5678 | 97/01/01, 11:50 |
| E-MAIL RECEIVING ERROR NOTICE ACK. | Fax@oooo.co.jp | 03-5555-5555 | 97/01/01, 11:50 |

TABLE 1

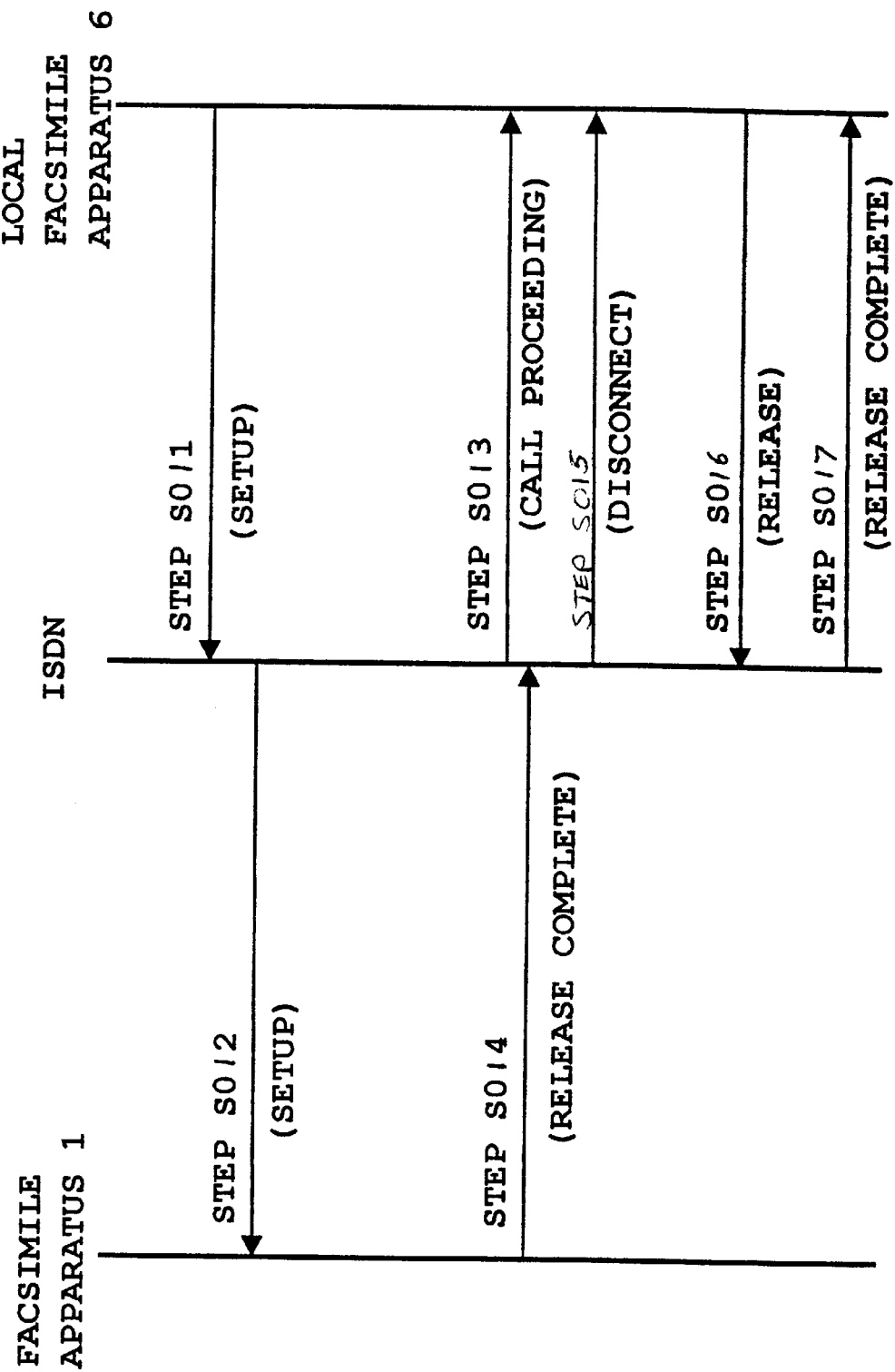

METHOD AND APPARATUS FOR FACSIMILE THAT NOTIFIES AN E-MAIL TRANSMISSION USING FACSIMILE PROTOCOL

BACKGROUND

1. Field of the Invention

This application relates to a method and apparatus for image transmission, and more particularly to a method and apparatus for image transmission that sends an image by both electronic mail and facsimile and that is capable of notifying a local facsimile apparatus of an incoming electronic mail using a facsimile protocol.

2. Description of the Related Art

A unique communications apparatus has been developed recently, which is capable of transmitting and receiving facsimile image data through the Internet using its low cost communications capability. One typical example is a facsimile apparatus that has a LAN (local area network) capability. This facsimile apparatus can send a facsimile image by way of electronic mail having an attachment of image data, using various communications protocols related to the Internet, such as TCP/IP (transmission control protocol/Internet protocol), SMTP (simple mail transfer protocol), MIME (multipurpose Internet mail extension), and so forth.

Another typical example is a so-called Internet facsimile apparatus that can perform Internet communication using a dial-up function. More specifically, the Internet facsimile apparatus transmits and receives electronic mail with an attachment of image data via a mail box of an Internet service provider using a PPP (point-to-point protocol) protocol. In connection with this Internet facsimile application, Internet service providers have recently been developing various Internet services convenient to these Internet-capable facsimile apparatuses.

A difference between the facsimile transmission through the facsimile protocol and the electronic mail transmission through the Internet communications protocol is on a real time performance. The facsimile transmission achieves a real time operation at a relatively high level. However, the Internet communications with the electronic mail has a problem in a real time operation because in the Internet, electronic mail is relayed to a destination through an indefinite number of Internet servers. Accordingly, since electronic mail may not reach a destination Internet server in a real time fashion, a destination user may need to check with the Internet server for incoming electronic mail from time to time.

For example, Japanese Laid-Open Patent Publication No. JPAP7-154418 (1995) describes a technique in which a check system automatically checks a local electronic mail system for incoming electronic mail for a plurality of users in a LAN environment. This technique attempts to eliminate a problem caused by each user individually having to check the electronic mail system for incoming electronic mail. For another example, Japanese Laid-Open Patent Publication No. JPAP9-198327 (1997) describes a technique in which a PC (personal computer) automatically performs a dial-up operation for connecting to an Internet server at regular predetermined time intervals to check for incoming electronic mail. This technique attempts to eliminate a problem caused by each user having to start the PC each time the user desires to check incoming electronic mail.

However, with the above-mentioned techniques, in order to receive the electronic mail in a near-instant manner, the communications terminals are required to increase a frequency with which they check for incoming electronic mail with an Internet server through the public telephone network. Therefore, the above-mentioned techniques increase the cost of communications.

It is believed that there is no system available that allows a local facsimile terminal to receive an incoming electronic mail in a near-instant manner at a relatively low communication cost.

SUMMARY

The present application provides a facsimile apparatus that is capable of notifying a called facsimile terminal of an electronic mail transmission through a public telephone network at a relatively low communication cost. In one embodiment, the facsimile apparatus includes a facsimile image transmitter and receiver, a memory, an electronic mail generator, an electronic mail transmitter and receiver, and an electronic mail controller.

The facsimile image transmitter and receiver transmits and receives a facsimile image through the public telephone network. The memory registers a plurality of facsimile terminals to be called and stores information sets pertinent thereto.

Preferably, each of the information sets includes a user name, a facsimile number, and an electronic mail address for an Internet communication.

The electronic mail generator generates electronic mail that includes an attachment file of image data and that is addressed to one of the registered facsimile terminals using the electronic mail address thereof. The electronic mail transmitter and receiver transmits the electronic mail generated by the electronic mail generator to an Internet server of a subscribing Internet service provider and receives electronic mail from the Internet server, through the public telephone network.

The electronic mail controller controls the facsimile image transmitter and receiver to transmit electronic mail, which is addressed to one of the registered facsimile terminals using the electronic mail address thereof, to the Internet server. The electronic mail controller further controls the facsimile image transmitter and receiver to transmit an electronic mail transmission notice to the same one of the registered facsimile terminals using the facsimile number thereof, through the public telephone network, immediately after the electronic mail transmitter and receiver sends electronic mail.

The electronic mail controller can control an access call to the Internet server with the electronic mail transmitter and receiver to receive an incoming electronic mail upon receiving through the public telephone network an electronic mail transmission notice notifying transmission of the incoming electronic mail from a different facsimile terminal.

The electronic mail controller can perform a first try of the access call in a predetermined time after receiving the electronic mail transmission notice, and successive tries at predetermined intervals for up to a number of predetermined times when the incoming electronic mail is not found in the Internet server.

The electronic mail controller can control the facsimile image transmitter and receiver to transmit an electronic mail receipt notice to the different facsimile terminal when successfully receiving the incoming electronic mail.

In addition, the facsimile apparatus preferably includes a communications status controller that maintains statuses of each communications operation having been made on basis of information sent back from the one of the registered facsimile terminals and that outputs updated contents of the statuses.

In addition, the facsimile apparatus preferably includes an electronic mail transmission selector that selects either one of image data transmissions by facsimile and by electronic mail. If the facsimile apparatus includes the electronic mail transmission selector, the electronic mail controller determines a performance of the image data transmission either by facsimile or electronic mail depending upon the electronic mail transmission selector.

Preferably, each of the information sets stored in the memory includes an electronic mail invalidating flag. If each of the information sets includes an electronic mail invalidating flag, the electronic mail controller performs the image data transmission by facsimile when the electronic mail invalidating flag corresponding to the one out of the registered facsimile terminals to be called is set.

Preferably, the public telephone network includes at least one of a public switched telephone network and an integrated services digital network.

The present invention also provides an electronic communications system that is capable of routing an incoming electronic mail notification from a calling facsimile terminal to a called facsimile terminal. In one embodiment, the system includes at least two facsimile apparatus which are coupled to at least one public telephone network. Each of the facsimile apparatus includes a facsimile image transmitter and receiver, a memory, an electronic mail generator, an electronic mail transmitter and receiver, and an electronic mail controller.

The facsimile image transmitter and receiver transmits and receives a facsimile image through the public telephone network. The memory registers a plurality of facsimile terminals to be called, including the other one of said at least two facsimile apparatus, and stores information sets pertinent thereto. Preferably, each of the information sets includes a user name, a facsimile number, and an electronic mail address for an Internet communication.

The electronic mail generator generates electronic mail that includes an attachment file of image data and that is addressed to one of the registered facsimile terminals using the electronic mail address thereof. The electronic mail transmitter and receiver transmits the electronic mail generated by the electronic mail generator to an Internet server of a subscribing Internet service provider and receives electronic mail from the Internet server, through the public telephone network.

The electronic mail controller controls the facsimile image transmitter and receiver to transmit electronic mail, which is addressed to one of the registered facsimile terminals using the electronic mail address thereof, to the Internet server. The electronic mail controller further controls the facsimile image transmitter and receiver to transmit an electronic mail transmission notice to the same one of the registered facsimile terminals using the facsimile number thereof, through the public telephone network, immediately after the electronic mail transmitter and receiver sends electronic mail.

According to an aspect of the present invention, a communication system is provided for transmitting and receiving information via a facsimile information communication system and an Internet. The system comprises an electronic mail generator and transmitter that generates and transmits electronic mail including an attachment file of image data to a communication terminal via the Internet and a facsimile information communication system controller for transmitting to a communication terminal to which the electronic mail including the attachment file of image data is addressed, via the facsimile information communication system, a notice indicating to the communication terminal to which the electronic mail is addressed, that an e-mail has been forwarded thereto. The communication apparatus may comprise a facsimile device and the facsimile information communication system may comprise a public telephone network.

The electronic mail generator and transmitter may transmit the electronic mail including the attachment file of image data to a first Internet service provider. The first Internet service provider may transmit the electronic mail including the attachment file of image data to the second Internet service provider. The communication terminal attempts to access and retrieve the electronic mail including the attachment file of image data from the second service provider in response to receiving the notice.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein:

FIG. 3 is an exemplary local terminal information list provided to the facsimile apparatus of FIG. 2;

FIG. 5 is an exemplary D-channel communications procedure made when the facsimile apparatus of FIG. 2 sends electronic mail to a local facsimile apparatus;

FIG. 6 is a table for explaining various information notices exchanged between the local facsimile apparatus and the facsimile apparatus of FIG. 2, in connection with electronic mail;

FIG. 7 is an exemplary D-channel communications procedure made when a local facsimile apparatus sends electronic mail to the facsimile apparatus of FIG. 2;

DETAILED DESCRIPTION

Figure 1:
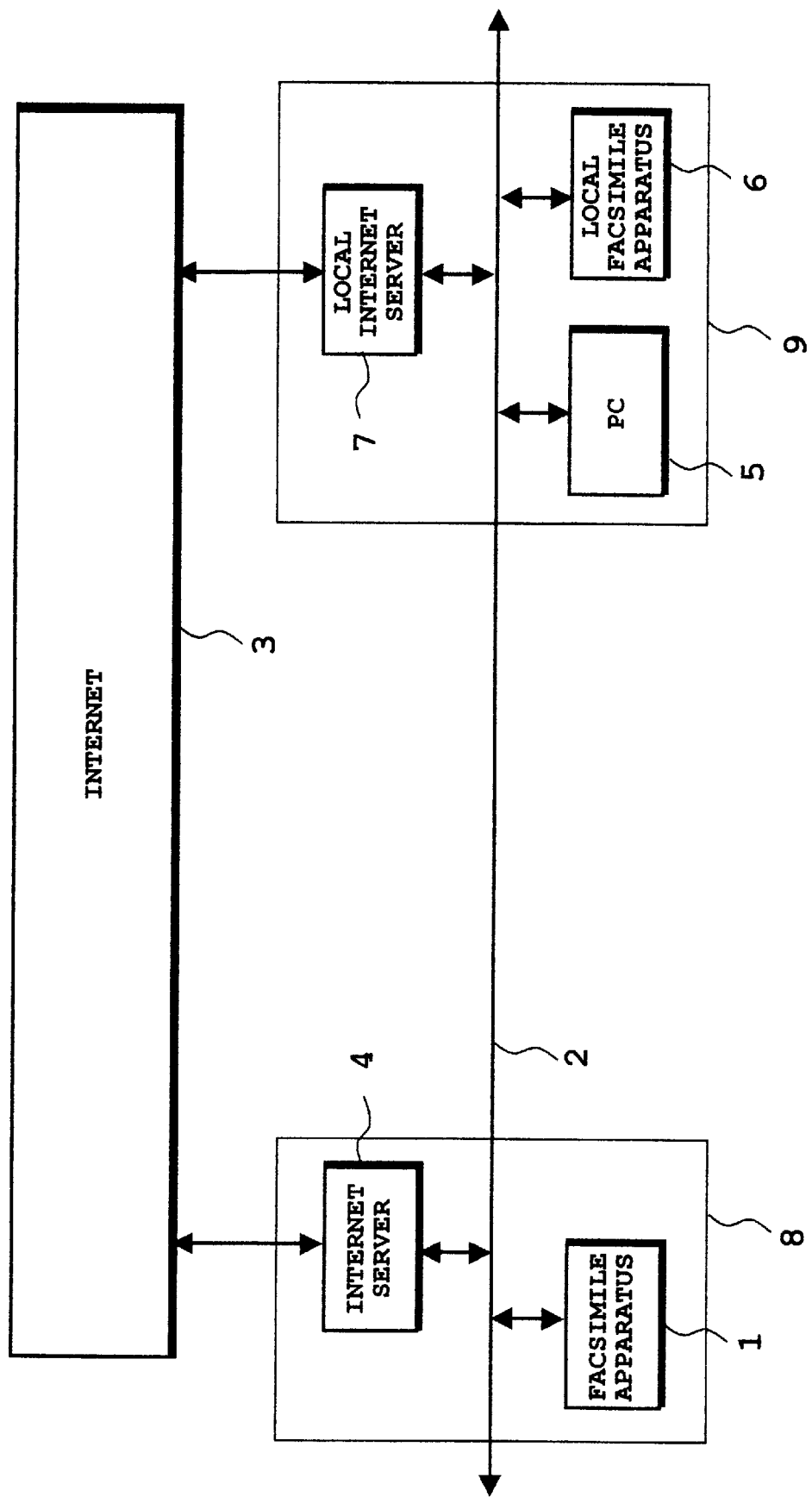
FIG. 1 is a schematic block diagram of an electronic communications system including a facsimile apparatus according to the present application.

In describing preferred embodiments of the present application illustrated in the drawings, specific terminology is employed for the sake of clarity. However, the present application is not intended to be limited to the specific terminology so selected and it is to be understood that each specific element includes all technical equivalents which operate in a similar manner.

Referring now to the drawings, like reference numerals designate identical or corresponding parts throughout the several views. FIG. 1 illustrates a schematic block diagram of an electronic communications system which includes an exemplary embodiment of a facsimile apparatus 1 according to the present application. The electronic communications system of FIG. 1 includes the facsimile apparatus 1, a public telephone network 2, the Internet 3, an Internet server 4, a PC (personal computer) 5, a local facsimile apparatus 6, and a local Internet server 7. The facsimile apparatus 1 and the Internet server 4 are located in an area 8, for example. The PC 4, the local facsimile apparatus 6 and the local Internet server 7 are located in an area 9, for example. The area 8 is distant from the area 9.

As illustrated in FIG. 1, the facsimile apparatus 1 is connected to the Internet server 4, the PC 5, the local facsimile apparatus 6, and the local Internet server 7, via the public telephone network 2. The public telephone network 2 may be a PSTN (public switched telephone network) or an ISDN (integrated services digital network). The facsimile apparatus 1, the PC 5, and the local facsimile apparatus 6 may access the Internet via the Internet servers 4 and the 7. Both the PC 5 and the local facsimile apparatus 6 include a dial-up communications function and are regarded as local communications terminals for the facsimile apparatus 1 to communicate with. Although only one each of typical examples of the PC 5 and of the local facsimile apparatus 6 are illustrated in FIG. 1, the electronic communications system in an actual application may include a plurality of PCs 5 and a plurality of local facsimile apparatuses 6.

The user of the facsimile apparatus 1 preferably has a subscribership contract with an Internet service provider A (not shown) for Internet services including E-mail services, and is able to communicate with the Internet server 4 provided by Internet Service provider A in the area 8. The users of the PC 5 and the local facsimile apparatus 6 preferably have a subscribership contract with an Internet service provider B (not shown) for Internet services including E-mail services, and are able to communicate with the Internet server 7 provided by Internet service provider B in the area 9. The Internet service providers A and B may not necessarily be different and may be the same entity having a plurality of the Internet servers in different locations, including the Internet servers 4 and 7. As an alternative way of providing a connection between the facsimile apparatus 1 and the Internet server 4, the facsimile apparatus 1 may be connected to the Internet server 4 through a private line, a local area network (LAN), or a wide area network (WAN).

Figure 2:
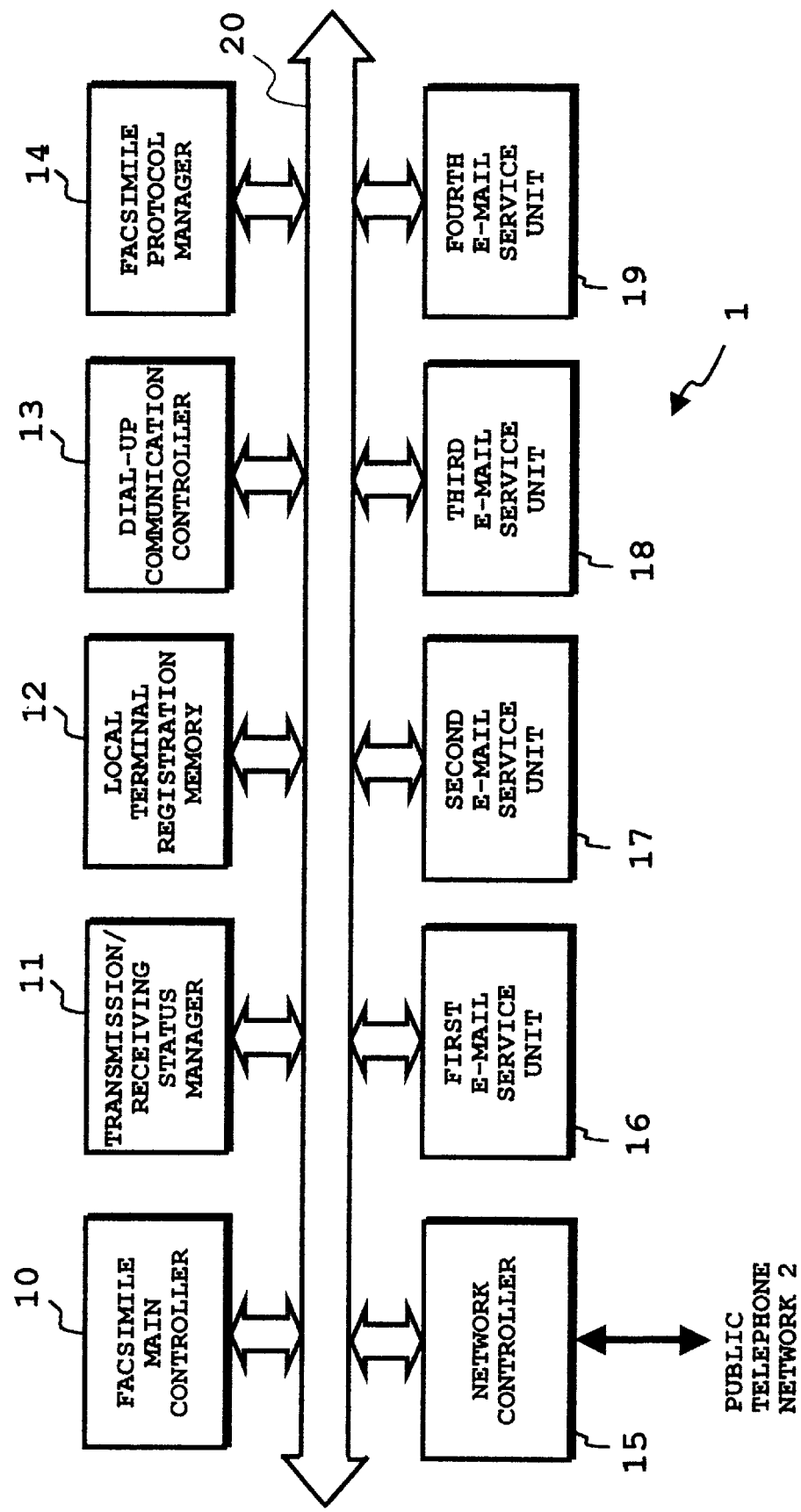
FIG. 2 is a detailed block diagram of the facsimile apparatus of FIG. 1.

Next, an exemplary configuration of the facsimile apparatus 1 of FIG. 1 will be explained with reference to FIG. 2. As illustrated in FIG. 2, facsimile apparatus 1 of FIG. 1 includes a facsimile main controller 10, a transmission/receiving status manager 11, a local terminal registration memory 12, a dial-up communications controller 13, a facsimile protocol manager 14, and a network controller 15. Further, facsimile apparatus 1 includes first, second, third, and fourth E-mail (electronic mail) service units 16–19, and a system bus 20.

The facsimile main controller 10 includes an image reading unit (not shown), such as a scanner, for reading image data from an original document (not shown), which is then handled as facsimile image data to be transmitted to the local communications terminals. The facsimile main controller 10 further includes an image writing unit (not shown), such as a laser printer, for printing onto a recording sheet (not shown) facsimile image data which has been received from one of the local communications terminals. The facsimile main controller 10 further includes a console unit (not shown), including a data entry unit (not shown) such as a keyboard, for inputting various instructions with respect to communications of facsimile or E-mail that has an attachment of a image data file. The facsimile main controller 10 further includes an encoding and decoding unit (not shown) for encoding image data to be transmitted to, and decoding image data which has been received from one of the local communications terminals. The facsimile main controller 10 controls the operations of these units included therein.

The transmission/receiving status manager 11 maintains various kinds of status information related to the transmission and receiving operations for both facsimile and E-mail. The local terminal registration memory 12 stores various kinds of information which pertain to the local communications terminals. For example, the information includes a plurality of sets of facsimile number and E-mail address for a plurality of local communications terminals, including the PC 5 and the local facsimile apparatus 6. Details of the information included in both of the transmission/receiving status manager 11 and the local terminal registration memory 12 will be explained later.

The dial-up communications controller 13 performs protocol communications operations of TCP/IP (transmission control protocol/Internet protocol) and PPP (point-to-point protocol), each of which is initiated when the facsimile apparatus 1 accesses the Internet server 4 of the Internet service provider A, for example, via the public telephone network 2. The facsimile protocol manager 14 performs a protocol communications operation of a regular facsimile protocol which is initiated when the facsimile apparatus 1 transmits facsimile image data to or receives facsimile image data from the local communications terminal such as the local facsimile apparatus 6, for example, via the public telephone network 2. The network controller 15 controls call transmission and call receiving operations in both ISDN and PSTN communications so as to enable the dial-up communications controller 13 to connect to the Internet server 4 of the Internet service provider A, for example, and the facsimile protocol manager 14 to connect to one of the local communications terminal, such as the local facsimile apparatus 6, for example, via the public telephone network 2. The first E-mail service unit 16 controls services for transmitting and receiving E-mail via the Internet with the help of the dial-up communications controller 13 and the network controller 15, using the communications protocols of SMTP (simple mail transfer protocol) and POP (post office protocol) of which the latest version is called POP 3. The second E-mail service unit 17 selects either one of the communications operations for transmitting image data using E-mail and the regular facsimile, and is normally set to a condition in which selection of the E-mail transmission is given a higher priority than the regular facsimile transmission.

The third E-mail service unit 18 performs operations for handling E-mail transmission information indicating that an E-mail is transmitted. Also, when a transmission of E-mail with an attachment of image data to a local communications terminal is completed, the third E-mail service unit 18 transmits the E-mail transmission information to the local communications terminal using the facsimile protocol manager 14 and the network controller 15. When receiving the E-mail transmission information from a local communications terminal, the third E-mail service unit 18 initiates operations for receiving E-mail. More specifically, the third E-mail service unit 18 accesses the Internet server 4 of the subscribing Internet service provider A in order to receive E-mail, and controls a time of such an access to the Internet server 4.

The fourth E-mail service unit 19 encodes image data read by the scanner into a MIME (multipurpose Internet mail extension) format so that the image data can be attached to E-mail for transmission. Also, the fourth E-mail service unit 19 decodes image data which is attached to a received E-mail into a TIFF (tagged image file format) file which is readable by PCS (personal computers), including the PC 5. The bus 20 interconnects the above-described units so as to allow bidirectional communications between the units.

The facsimile apparatus 1 is configured as described above. In addition, this configuration for the facsimile apparatus 1 is provided also to the local facsimile apparatus 6 which has a general configuration of the facsimile machine. Furthermore, this configuration may also be provided to the PC 5 which has a general configuration of the personal computer.

For the sake of clarity, in the following description, units of the local facsimile apparatus 6 which are similar to those of the facsimile apparatus 1 are given the same unit names and the numeral references as those of the facsimile apparatus 1 but with a suffix of "a" to each numeral reference, such as the facsimile main controller 10a, for example.

Next, an exemplary operation of E-mail transmission with an attachment of image data between the facsimile apparatus 1 and the local facsimile apparatus 6 is explained with reference to FIGS. 3–8. In the following description, the public telephone network 2 is the ISDN.

The local terminal registration memory 12 of the facsimile apparatus 1 includes a local terminal information list 30 which contains a plurality of information sets associated with a plurality of local communications terminals including the PC 5 and the local facsimile apparatus 6. In the local terminal information list 30 of FIG. 3, each of the information sets in a row includes various kinds of information pertaining to a specific local communications terminal. The information includes a local terminal number 31 representing an identification number to be used within the facsimile apparatus 1. Further, the information includes a user name 32 representing a user name, a facsimile number 33 representing a facsimile number, and an E-mail address 34 representing an E-mail address of the specific local communications terminal. The information further includes a provider's number 35 which represents a telephone number of an Internet server of a subcontracting Internet provider, and an E-mail invalidating flag 36 representing a condition in which the image data transmission by E-mail is canceled and the image data transmission by facsimile is performed.

For example, if the local facsimile apparatus 6 is registered as 1 in the local terminal number 31, the user name thereof is ABC as indicated in the user name 32, the facsimile number thereof is 06-1234-5678 as indicated in the facsimile number 33, the E-mail address thereof is abcd@oooo.co.jp as indicated in the E-mail address 34, and the telephone number of the Internet server 4 of the subscribing Internet service provider A is 03-9999-9999 as indicated in the provider's number 35. In addition, the E-mail invalidating flag is set to 1, which means that the image data transmission is performed by facsimile, as indicated in the E-mail invalidating flag 36.

The exemplary E-mail transmission operation starts when an original document is placed on the scanner of the facsimile apparatus 1. Then, when an operator inputs 1 through the console unit to designate the local facsimile apparatus 6 from among various local communications terminals registered in the local terminal number 31 of the local terminal information list 30 of the local terminal registration memory 12, the facsimile main controller 10 reads a corresponding E-mail address, abcd@oooo.co.jp, from the E-mail address 34. The facsimile main controller 10 then sets an address for E-mail transmission to abcd@oooo.co.jp. Then, upon a press of a start button on the console unit, the facsimile main controller 10 controls the scanner to read the original document and stores the read image data as input image data.

Figure 4:
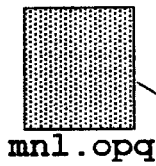
FIG. 4 is an exemplary electronic mail with an image file generated by the facsimile apparatus of FIG. 2.

Further, the facsimile main controller 10 instructs the fourth E-mail service unit 19 to encode the input image data into the MIME format, for example, so that the input image data can be attached to an E-mail. At the same time, the facsimile main controller 10 controls the first E-mail service unit 16 to generate an E-mail which is addressed to abcd@oooo.co.jp. The facsimile main controller 10 then attaches the input image data in the MIME format to the E-mail generated by the first E-mail service unit 16. FIG. 4 illustrates an exemplary E-mail 40 generated in the above described way. The exemplary E-mail 40 of FIG. 4 includes an attachment file 40a which is the input image data in the MIME format.

Then, the first E-mail service unit 16 initiates a call through the network controller 15 to 03-9999-9999 which is the telephone number for the Internet server 4 of the Internet provider A to which the facsimile apparatus 1 has the subscribership contract. After the connection between the facsimile apparatus 1 and the Internet server 4 is established, the dial-up communications controller 13 initiates the PPP and TCP/IP protocols. Then, the first E-mail service unit 16 sends a user identification for identifying a sender of the E-mail 40 and a command for sending the E-mail 40 to abcd@oooo.co.jp to the Internet server 4.

In this way, the facsimile apparatus 1 transmits the E-mail 40 including the attachment file 40a to the Internet service 4, via the public telephone network 2. The facsimile apparatus 1 is previously provided with the information of the user identification and the command to be sent to the Internet server 4 during the above-described operation. Also, the facsimile apparatus 1 automatically generates all the text data included in the E-mail 40 other than the attachment file 40a.

After completing the transmission of E-mail, the first E-mail service unit 16 performs an operation for disconnecting the line with the Internet server 4 using the network controller 15. Then, the first E-mail service unit 16 instructs the third E-mail service unit 18 to start an E-mail transmission notifying operation so that an E-mail transmission notice is sent to the local facsimile apparatus 6. More specifically, in the E-mail transmission notifying operation, the third E-mail service unit 18 reads 06-1234-5678 corresponding to the local terminal number 1 from the facsimile number 33 of the local terminal information list 30. Then, the third E-mail service unit 18 instructs the network controller 15 to initiate a call to 06-1234-5678, which is the number for the local facsimile apparatus 6. During a time of establishing a connection with the local facsimile apparatus 6, the third E-mail service unit 18 executes an E-mail transmission notifying communications protocol which has communications steps as indicated in FIG. 5.

In the E-mail transmission notifying communications protocol of FIG. 5, the facsimile apparatus 1 starts to establish a connection with the local facsimile apparatus 6 by sending in Step S001 a SETUP message to the public telephone network 2 which is the ISDN. The SETUP message includes information of a non-restricted BC (bearer capability), a CPN (called party number) indicating 06-1234-5678, and a UUI (user—user information) indicating an E-mail transmission notice. Upon receiving the information from the facsimile apparatus 1, the ISDN transfers in Step S002 the information of the non-restricted BC and the UUI of the E-mail transmission notice to the CPN which is 06-1234-5678.

In this way, the third E-mail service unit 18 of the facsimile apparatus 1 sends an E-mail transmission notice through the network controller 15 to the local facsimile apparatus 6 via the public telephone network 2 which is the ISDN. Such an E-mail transmission notice is one of notices sent from the facsimile apparatus 1 to a local communications terminal in a connecting condition therewith. Some exemplary notices including the E-mail transmission notice are shown in a table I of FIG. 6. As shown in the table I of FIG. 6, each notice includes a plurality of information sets in rows which include a notice type 51 representing types of notices such as an E-mail transmission notice sent from a calling party, a calling party E-mail address 52 representing an E-mail address of the calling party, a calling party facsimile number 53 representing a facsimile number of the calling party, and a transmission time 54 representing a date and time of an execution of E-mail transmission. For example, in the example being explained, an exemplary E-mail transmission notice of FIG. 6 includes fax@oooo.co.jp as the calling party E-mail address, 03-5555-5555 as the calling party facsimile number 53, and 10:10/01.01.1997 as the transmission time 54.

When the third E-mail service unit 18 sends the E-mail transmission notice to the local facsimile apparatus 6 in Step S001, as described above, the transmission/receiving status manager 11 holds the status information that the E-mail is sent but a delivery of the E-mail is not confirmed.

After transferring the SETUP message to the local facsimile apparatus 6 in Step S002, the ISDN sends in Step S003 a CALL PROCEEDING message back to the facsimile apparatus 1. The local facsimile apparatus 6 receives the SETUP message sent from the ISDN using the network controller thereof and recognizes the E-mail transmission notice with the third E-mail service unit based on the UUI of the received SETUP message. Then, in Step S004, the local facsimile apparatus 6 sends a RELEASE COMPLETE message back to the ISDN in order to refuse the call from the facsimile apparatus 1. At this time, the RELEASE COMPLETE message includes a normal disconnection as a cause and an E-mail transmission notice acknowledgment as the UUI. In this case, as shown in FIG. 6, the E-mail transmission notice acknowledgment as the UUI includes abcd@oooo.co.jp of the calling party E-mail address 52, 06-1234-5678 of the calling party facsimile number 53, and 10:10/01.01.1997 of the transmission time 54.

Then, in Step S005, the ISDN sends a DISCONNECT message to the facsimile apparatus 1 in order to transfer the information of the normal disconnection as the cause and the E-mail transmission notice acknowledgment as the UUI from the local facsimile apparatus 6. After that, the facsimile apparatus 1 sends a RELEASE message in Step S006 so as to complete the call, and the ISDN sends a RELEASE COMPLETE message in Step S007 back to the facsimile apparatus 1. Accordingly, the facsimile apparatus 1 and the local facsimile apparatus 6 end the E-mail transmission notifying communications protocol. In this way, the E-mail transmission notice and the acknowledgment thereto can be exchanged between the facsimile apparatus 1 and the local facsimile apparatus 6 via a D-channel that exchanges control messages in the ISDN without performing communications via a B-channel that exchanges digital messages in the ISDN. As a result, the local facsimile apparatus 6 can be aware of an incoming E-mail.

Upon receiving the E-mail transmission notice from the facsimile apparatus 1, the local facsimile apparatus 6 instructs the third E-mail service unit thereof to perform an operation for receiving the incoming E-mail, using the dial-up communications controller and the network controller of the local facsimile apparatus 6. In the E-mail receiving operation, the third E-mail service unit of the local facsimile apparatus 6 accesses the Internet server 7 of the subscribing Internet service provider B so as to receive the incoming E-mail, using the telephone number for the Internet server 7 stored in the local terminal registration memory and the access timing registered in the third E-mail service unit of the local facsimile apparatus 6.

In the above-mentioned E-mail receiving operation, the local facsimile apparatus 6 starts to access the Internet server 7 of the subscribing Internet service provider B a predetermined time, for example, ten minutes, after receiving the E-mail transmission notice, in order to receive the incoming E-mail. In a case that the local facsimile apparatus 6 does not receive the incoming E-mail from the Internet server 7 because the incoming E-mail has not yet reached the Internet server 7, the local facsimile apparatus 6 repeats the access to the Internet server 7 at predetermined intervals of time, for example, ten minutes. The local facsimile apparatus 6 can perform this repeat access up to a predetermined number of times, for example, ten times. These parameters used during the E-mail receiving operation may previously be stored therein. Furthermore, these parameters may differently be set in accordance with information included in a calling-party list (not shown) stored therein.

During the E-mail receiving operation by the local facsimile apparatus 6, the local facsimile apparatus 6 sends the user identification and a command for the E-mail services to the Internet server 7. Then, the local facsimile apparatus 6 checks if the incoming E-mail is stored in the Internet server 7. If the incoming E-mail is stored in the Internet server 7, the local facsimile apparatus 6 receives the incoming E-mail and, then, disconnects the line. If the incoming E-mail is not stored in the Internet server 7, the local facsimile apparatus 6 retries the access to the Internet server 7 in ten-minute intervals according to the above-described repeat access condition so as to receive the incoming E-mail.

Upon receiving the incoming E-mail with the image data file from the Internet server 7, the local facsimile apparatus 6 instructs the fourth E-mail service unit thereof to decode the image data file attachment in the MIME format into image data in the TIFF format, for example. In a case of the PC 4, an application software program performs an image data decoding and displaying operation when the operator instructs to display the image data file attached to the incoming E-mail. After completing the decoding operation, the local facsimile apparatus 6 records the decoded image data onto a recording sheet using the printer of the facsimile main controller of the local facsimile apparatus 6.

Then, the local facsimile apparatus 6 checks if the incoming E-mail is in accordance with the information of the E-mail transmission notice on the basis of the called party E-mail address, the transmission time, and so forth which are contained in both the incoming E-mail and the E-mail transmission notice. If the local facsimile apparatus 6 determines that the incoming E-mail is in accordance with the information of the E-mail transmission notice, the local facsimile apparatus 6 initiates a call to the facsimile apparatus 1 via the public telephone network 2. In this call, the local facsimile apparatus 6 sends a call to 03-5555-5555 according to the facsimile number 53 of the table I of the local facsimile apparatus 6, shown in FIG. 6, using an E-mail receipt notifying communications protocol of FIG. 7.

In the E-mail receipt notifying communications protocol of FIG. 7, the local facsimile apparatus 6 starts to establish a connection with the facsimile apparatus 1 by sending in Step S011 a SETUP message to the public telephone network 2 which is the ISDN. The SETUP message includes information of a non-restricted BC (bearer capability), a CPN (called party number) indicating 03-5555-5555, and a UUI (user—user information) indicating an E-mail receipt notice. In this case, as shown in FIG. 6, the E-mail receipt notice includes abcd@oooo.co.jp of the calling party E-mail address 52, 06-1234-5678 of the calling party facsimile number 53, and 11:10/01.01.1997 of the transmission time 54. Upon receiving the information from the local facsimile apparatus 6, the ISDN transfers in Step S012 the information of the non-restricted BC and the UUI of the E-mail receipt notice to the CPN which is 03-5555-5555. In this way, the third E-mail service unit 18a of the local facsimile apparatus 6 sends an E-mail receipt notice through the network controller 15a thereof to the facsimile apparatus 1 via the public telephone network 2 which is the ISDN. After transferring the SETUP message to the facsimile apparatus 1 in Step S012, the ISDN sends in Step S013 a CALL PROCEEDING message back to the local facsimile apparatus 6. The facsimile apparatus 1 receives the SETUP message sent from the ISDN using the network controller 15 and recognizes that the E-mail has been received by the local facsimile apparatus 6 with the third E-mail service unit 18 based on the UUI of the received SETUP message. Then, in Step S014, the facsimile apparatus 1 sends a RELEASE COMPLETE message back to the ISDN in order to refuse the call from the local facsimile apparatus 6. At this time, the RELEASE COMPLETE message includes a normal disconnection as a cause and an E-mail receipt notice acknowledgment as the UUI. In this case, as shown in FIG. 6, the E-mail receipt notice acknowledgment includes fax@oooo.co.jp of the calling party E-mail address 52, 03-5555-5555 of the calling party facsimile number 53, and 11:10/01.01.1997 of the transmission time 54.

Then, in Step S015, the ISDN sends a DISCONNECT message to the local facsimile apparatus 6 in order to transfer the information of the normal disconnection as the cause and the E-mail receipt notice acknowledgment as the UUI from the facsimile apparatus 1. After that, the local facsimile apparatus 6 sends a RELEASE message in Step S016 so as to complete the call. Subsequently, the ISDN sends a RELEASE COMPLETE message in Step S017 back to the local facsimile apparatus 6. Accordingly, the facsimile apparatus 1 and the local facsimile apparatus 6 end the E-mail receipt notifying communications protocol.

In this way, the E-mail receipt notice and the acknowledgment thereto can be exchanged between the facsimile apparatus 1 and the local facsimile apparatus 6 via the D-channel that exchanges control messages in the ISDN without performing communications via the B-channel that exchanges digital messages in the ISDN. As a result, the facsimile apparatus 1 can be aware that the local facsimile apparatus 6 properly receives the E-mail.

If the local facsimile apparatus 6 does not find the incoming E-mail in the Internet server 7 after the repeated access operations, the local facsimile apparatus 6 sends an E-mail receiving error notice to the facsimile apparatus 1 using the facsimile number of the E-mail transmission notice, in the D-channel communications operation.

The E-mail receiving error notice indicates that the local facsimile apparatus 6 does not receive the incoming E-mail. In this case, as shown in FIG. 6, the E-mail receiving error notice includes abcd@oooo.co.jp of the calling party E-mail address 52, 06-1234-5678 of the calling party facsimile number 53, and 11:50/01.01.1997 of the transmission time 54. In response to the E-mail receiving error notice from the local facsimile apparatus 6, the facsimile apparatus 1 returns an E-mail receiving error notice acknowledgment to the local facsimile apparatus 6, in the D-channel communications operation. The E-mail receiving error notice acknowledgment indicates that the facsimile apparatus 1 receives the E-mail receiving error notice. In this case, as shown in FIG. 6, the E-mail receiving error notice acknowledgment includes fax@oooo.co.jp of the calling party E-mail address 52, 03-5555-5555 of the calling party facsimile number 53, and 11:50/01.01.1997 of the transmission time 54.

When receiving the E-mail receipt notice or the E-mail receiving error notice from the local facsimile apparatus 6 via the ISDN, the facsimile apparatus 1 updates the status information of the corresponding E-mail transmission registered in the transmission/receiving status manager 11, in accordance with the received E-mail receipt notice or the E-mail receiving error notice. Then, the facsimile apparatus 1 instructs the facsimile main controller 10 to display on the display or to produce on a recording sheet a communications report as an output from the status information stored in the transmission/receiving status manager 11.

Figure 8:
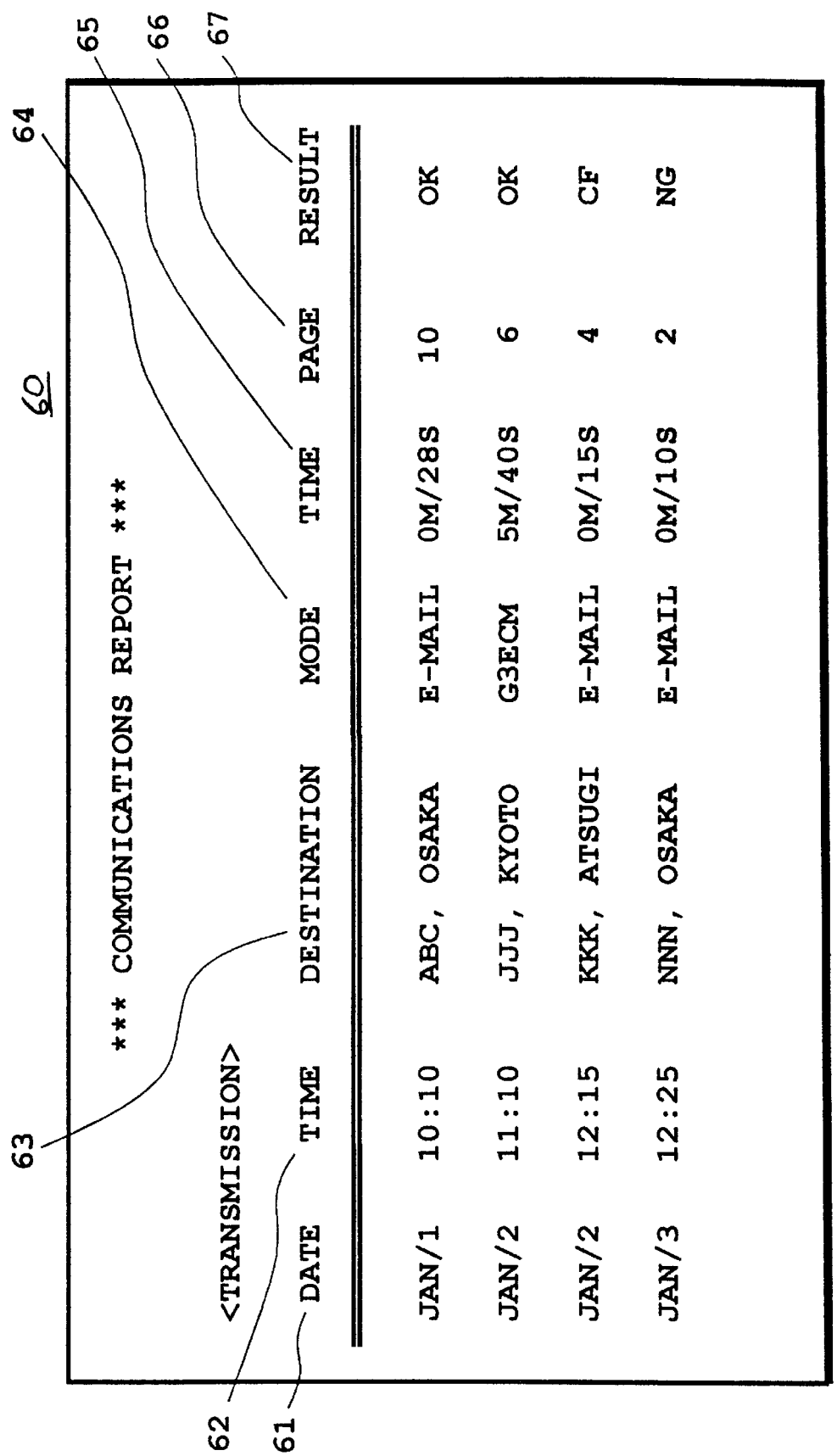
FIG. 8 is an exemplary communications report produced by the facsimile apparatus of FIG. 2.

An exemplary communications report 60 is illustrated in FIG. 8. As illustrated in FIG. 8, the communications report 60 indicates various kinds of information regarding the communications operation performed. The information of the communications report 60 includes a transmission date 61, a transmission time 62, a destination 63 indicating a called party, a transmission mode 64 indicating whether the transmission is made in an E-mail mode or a facsimile mode, a time spent 65 indicating a time spent for completing the transmission, a number-of-pages 66 indicating a number of pages which are transmitted, and a result 67 indicating a result of the transmission in accordance with the information of the E-mail receipt notice.

In the result 67 of the communications report 60, an OK mark indicates that the facsimile apparatus 1 receives the E-mail receipt notice from the destination local communications terminal and that the destination local communications terminal correctly receives the E-mail having the image data file sent from the facsimile apparatus 1. On the other hand, an NG mark in the result 67 indicates that the facsimile apparatus 1 receives the E-mail receiving error notice from the destination local communications terminal and that the destination local communications terminal fails to receive the E-mail having the image data file sent from the facsimile apparatus 1. Further, a CF mark in the result 67 indicates that the facsimile apparatus 1 receives none of the E-mail receipt and E-mail receiving error notices yet from the destination local communications terminal and that the destination local communications terminal are receiving the E-mail having the image data file sent from the facsimile apparatus 1.

In addition, in the beginning of the image data transmission operation on the facsimile apparatus 1, the facsimile main controller 10 of the facsimile apparatus 1 checks if the second E-mail service unit 17 is set to a user preference in which the regular facsimile transmission is selected. In this case, the facsimile main controller 10 sends the image data to the destination facsimile machine through the regular facsimile communications procedure using the facsimile protocol manager 14. For example, when GHI of the user name 32 of FIG. 3 is selected as a destination of image data transmission on the facsimile apparatus 1 with the selection of the regular facsimile transmission by the second E-mail service unit 17, the facsimile main controller 10 sends the image data to 01-8765-4321 of the user GHI according to the local terminal information list 30 of the local terminal registration memory 12 through the facsimile communications procedure using the facsimile protocol manager 14.

Figure 9:
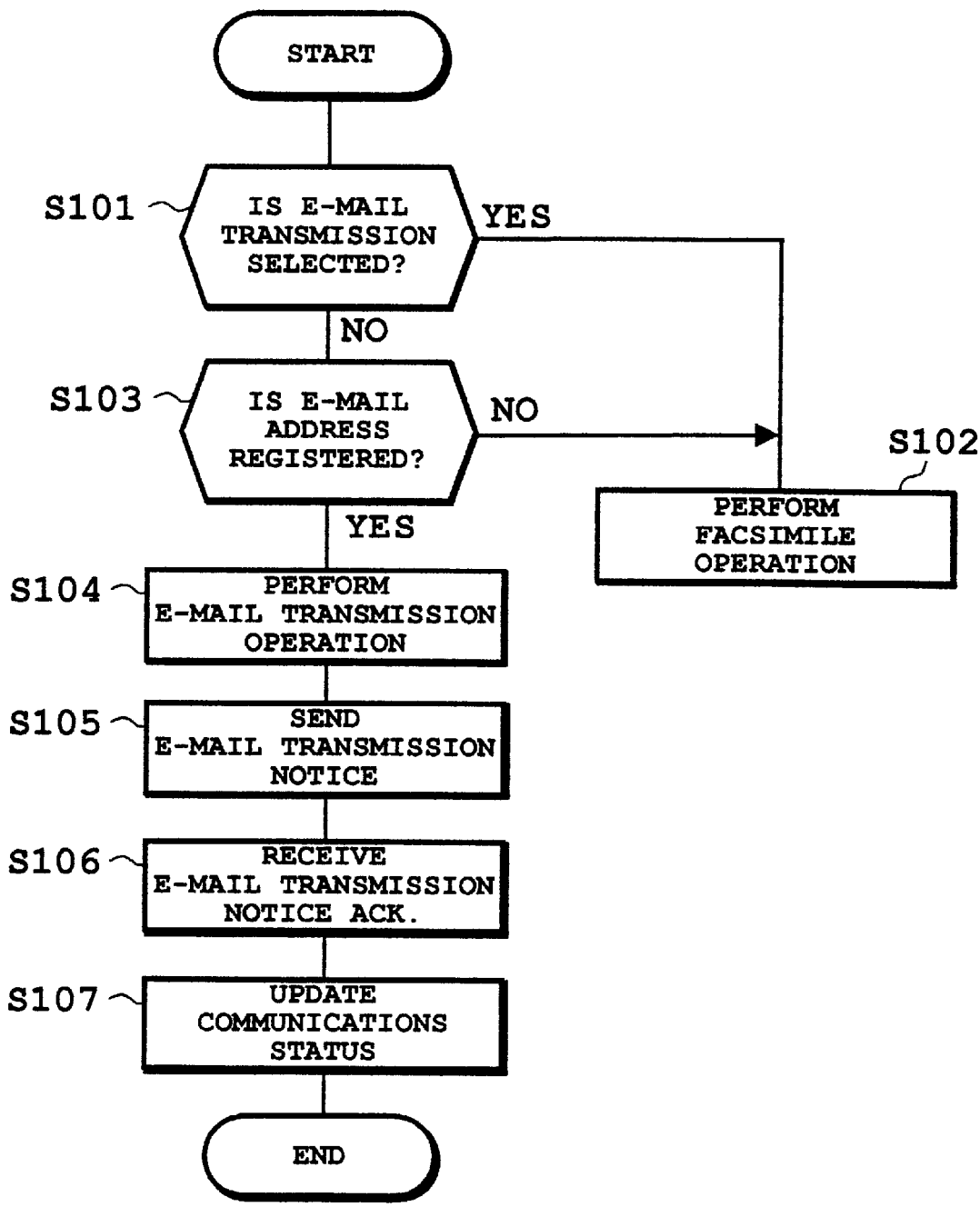
FIG. 9 is an exemplary flowchart explaining an exemplary operation of electronic mail transmission by the facsimile apparatus of FIG. 2.

Next, an exemplary operation flow of the image data transmission of the facsimile apparatus 1 is explained with reference to FIG. 9. When the operator presses the start button to send image data to the local facsimile apparatus 6, for example, the facsimile apparatus 1 starts to perform the image data transmission operation in accordance with the operation flow as indicated in FIG. 9. In Step S101 of FIG. 9, the facsimile main controller 10 determines if the second E-mail service unit 17 is set to the E-mail transmission or the regular facsimile transmission. If the second E-mail service unit 17 is set to the regular facsimile transmission (YES in Step S101), the facsimile main controller 10 performs the image data transmission through the regular facsimile procedure in Step S102. If the second E-mail service unit 17 is set to the normal condition in which the E-mail transmission is selected (NO in Step S101), the facsimile main controller 10 determines in Step S103 if the E-mail address of the local facsimile apparatus 6 is registered in the local terminal registration memory 12.

If the facsimile main controller 10 determines in Step S103 that the E-mail address of the local facsimile apparatus 6 is not registered in the local terminal registration memory 12 (NO in Step S103), the facsimile main controller 10 performs the image data transmission through the regular facsimile procedure in Step S102. If the facsimile main controller 10 determines in Step S103 that the E-mail address of the local facsimile apparatus 6 is registered in the local terminal registration memory 12 (YES in Step S103), the facsimile main controller 10 instructs the first E-mail service unit 16 to perform the image data transmission through the E-mail procedure and, then, the first E-mail service unit 16 performs the transmission of E-mail with an attachment of image data, in Step S104.

After the E-mail transmission, the first E-mail service unit 16 controls the third E-mail service unit 18 to send the E-mail transmission notice to the local facsimile apparatus 6 in Step S105 and to receive the E-mail transmission notice acknowledgment from the local facsimile apparatus 6 in Step S106. Then, in Step S107, the first E-mail service unit 16 instructs the transmission/receiving status manager 11 to update the status of the corresponding transmission operation to CF which means that the facsimile apparatus 1 receives the E-mail transmission notice acknowledgment from the destination local communications terminal and that the facsimile apparatus 1 receives none of the E-mail receipt and E-mail receiving error notices yet from the destination local communications terminal.

Figure 10:
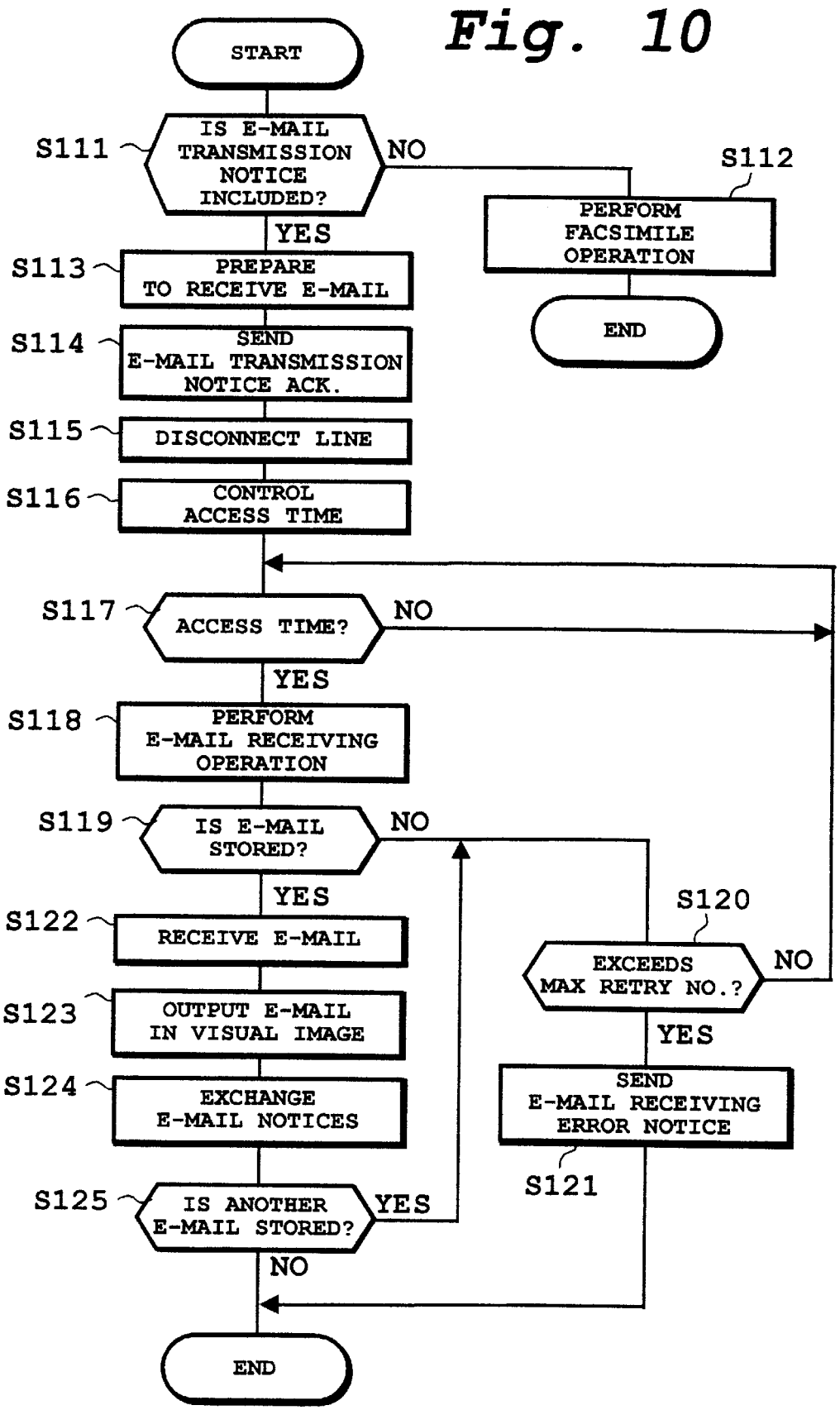
FIG. 10 is an exemplary flowchart explaining an exemplary operation of electronic mail receiving by the facsimile apparatus of FIG. 2.

Next, an exemplary operation flow of the image data receiving of the local facsimile apparatus 6 is explained with reference to FIG. 10. When the local facsimile apparatus 6 receives a call from the public telephone network 2, which is the ISDN in this case, the local facsimile apparatus 6 starts the image data receiving operation shown in FIG. 10. In Step S111 of FIG. 10, the facsimile main controller 10a of the local facsimile apparatus 6 determines if the UUI of the call includes an E-mail transmission notice. If the facsimile main controller 10a determines that the UUI of the call includes no E-mail transmission notice (NO in Step S111), the facsimile main controller 10a performs the image data transmission through the regular facsimile procedure in Step S112. If the facsimile main controller 10a determines that the UUI of the call includes the E-mail transmission notice (YES in Step S111), the facsimile main controller 10a instructs the first E-mail service unit 16a to prepare to receive the incoming E-mail in Step S113. In the preparation, the first E-mail service unit 16a instructs in Step S114 the third E-mail service unit 18a to send the E-mail transmission notice acknowledgment back to the facsimile apparatus 1. Subsequently, the first E-mail service unit 16a instructs the network controller 15a to disconnect the line in Step S115 and controls the third E-mail service unit 18a to start the Internet server access control in Step S116.

In Step S117, the third E-mail service unit 18a checks if it is time to access the Internet server to receive the incoming E-mail. If the check result of Step S117 is NO, the check of Step S117 is continuously performed. If the third E-mail service unit 18a determines that it is time to access the Internet server, the first E-mail service unit 16a starts the E-mail receiving operation in Step S118, in which the dial-up communications controller 13a accesses the Internet server 7 in accordance with the telephone number indicated in the local terminal information list 30a of the local terminal registration memory 12a.

Then, in Step S119, the first E-mail service unit 16a checks if the incoming E-mail is stored in the Internet server 7. If the first E-mail service unit 16a determines in Step S119 that the incoming E-mail is not stored in the Internet server 7 (NO in Step S119), the first E-mail service unit 16a checks in Step S120 if the number of access times exceeds a predetermined value. If the first E-mail service unit 16a determines in Step S120 that the number of access times does not exceed the predetermined value (NO in Step S120), the process returns to Step S117 to repeat the access time check. If the first E-mail service unit 16a determines in Step S120 that the number of access times exceeds the predetermined value (YES in Step S120), the third E-mail service unit 18a sends the E-mail receiving error notice to the facsimile apparatus 1 in accordance with the facsimile number indicated in the E-mail transmission notice.

If the first E-mail service unit 16a determines in Step S119 that the incoming E-mail is stored in the Internet server 7 (YES in Step S119), the first E-mail service unit 16a receives the incoming E-mail in Step S122. After receiving the incoming E-mail, the first E-mail service unit 16a controls the fourth E-mail service unit 19a to decode the image file attached to the E-mail and, then, the decoded image file is displayed on the display or recorded on a recording sheet, in Step S123. In Step S124, the third E-mail service unit 18a sends the E-mail receipt notice to and receives the E-mail receipt notice acknowledgment from the facsimile apparatus 1, through the D-channel communications via the ISDN.

Then, in Step S125, the first E-mail service unit 16a checks if another incoming E-mail is stored in the Internet server 7. If the first E-mail service unit 16a determines that another incoming E-mail is stored in the Internet server 7 (YES in Step S125), the process returns to Step S120 to repeat the Internet server access operation. If the first E-mail service unit 16a determines that no incoming E-mail is stored in the Internet server 7 (NO in Step S125), the first E-mail service unit 16a ends the E-mail receiving operation.

Next, an exemplary operation flow of the E-mail receipt notice receiving of the facsimile apparatus 1 is explained with reference to FIG. 11. When the facsimile apparatus 1 receives a call from the public telephone network 2, which is the ISDN, the facsimile apparatus 1 starts the E-mail receipt notice receiving operation shown in FIG. 11.

Figure 11:
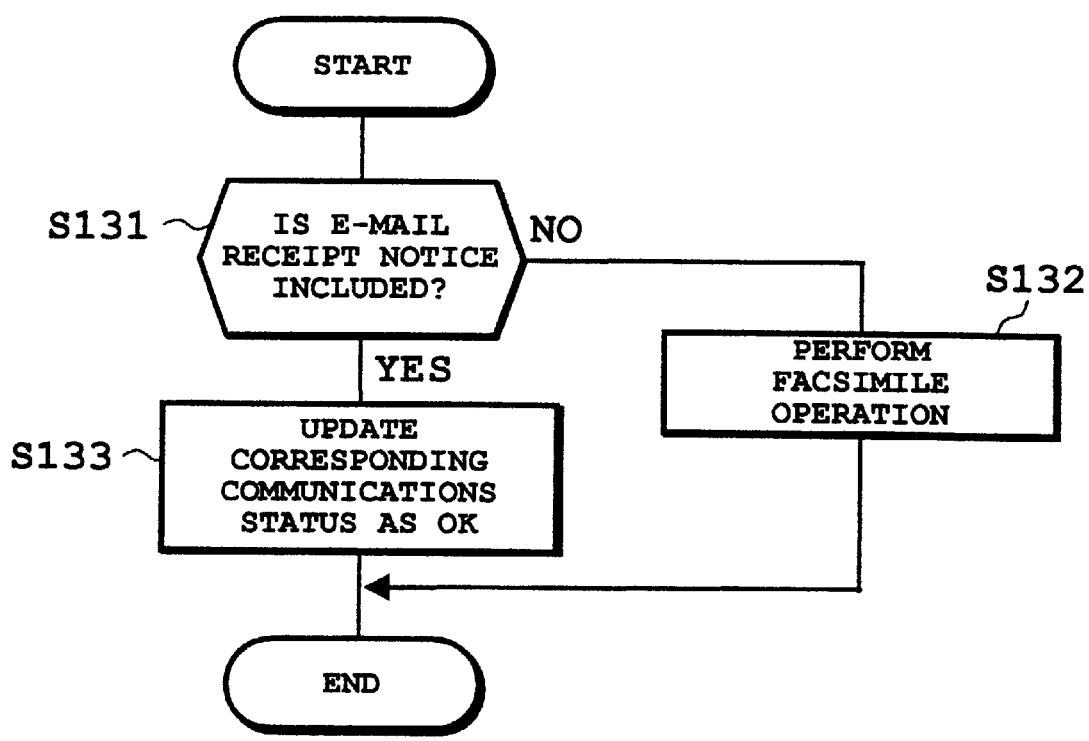
FIG. 11 is an exemplary flowchart explaining an exemplary operation of the facsimile apparatus of FIG. 2 when receiving an electronic mail receipt notice from a local facsimile apparatus.

In Step S131 of FIG. 11, the facsimile main controller 10 of the facsimile apparatus 1 determines if the UUI of the call includes an E-mail receipt notice from the local facsimile apparatus 6 to which the facsimile apparatus 1 has sent an E-mail having an image file attachment. If the facsimile main controller 10 determines that the UUI of the call includes no E-mail receipt notice (NO in Step S131), the facsimile main controller 10 performs a facsimile receiving operation through the regular facsimile procedure in Step S132. If the facsimile main controller 10 determines that the UUI of the call includes the E-mail receipt notice (YES in Step S131), the facsimile main controller 10 instructs the first E-mail service unit 16a to perform the E-mail receipt notice receiving operation in Step S133.

During the E-mail receipt notice operation in Step S133, the third E-mail service unit 18 sends the E-mail receipt notice acknowledgment back to the local facsimile apparatus 6. At the same time, the transmission/receiving status manager 11 updates the status of the corresponding transmission operation as OK which means that the facsimile apparatus 1 receives the E-mail receipt notice from the local facsimile apparatus 6 and that the local facsimile apparatus 6 correctly receives the E-mail having the image data file sent from the facsimile apparatus 1. Then, the first E-mail service unit 16 ends the E-mail receipt notice receiving operation.

In the example explained above, the UUI field of the SETUP message under the D-channel communications is used for exchanging various E-mail related notices, such as the E-mail transmission notice and the E-mail transmission notice acknowledgment, between the facsimile apparatus 1 and the local facsimile apparatus 6. Alternatively, a sub-address field of the SETUP message may also be used.

As a further alternative, the above-mentioned E-mail related notices may be exchanged through the regular facsimile communications protocol which is performed after a connection is established between the facsimile apparatus 1 and the local facsimile apparatus 6 based on the call via the PSTN or the ISDN.

Figure 12:
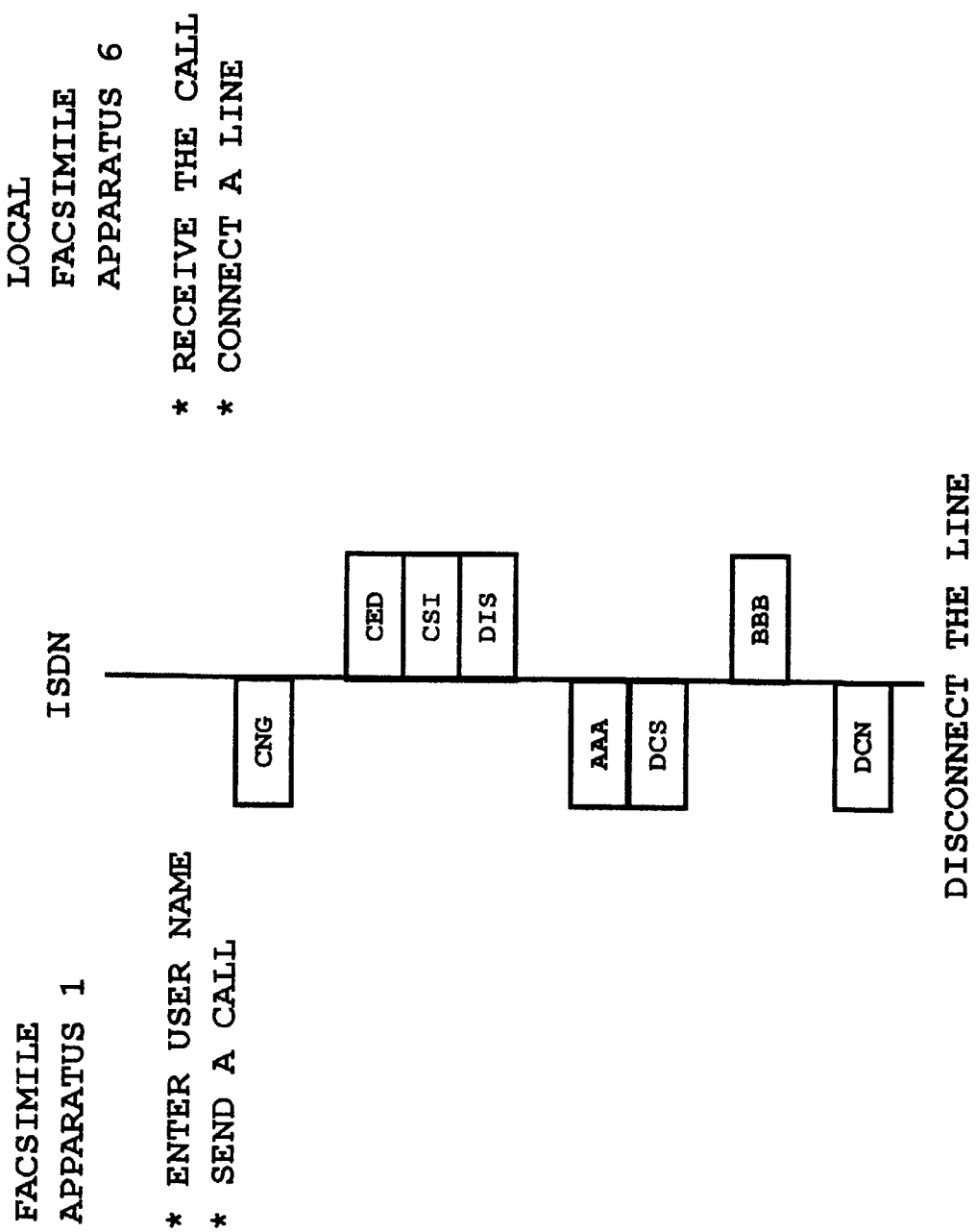
FIG. 12 is an exemplary communications procedure made through a Group 3 facsimile protocol between a local facsimile apparatus and the facsimile apparatus of FIG. 2.

An exemplary E-mail transmission notifying procedure using the Group 3 facsimile protocol via the PSTN is illustrated in FIG. 12. In this example, an indication that represents a capability of notifying statuses of the E-mail transmission and receiving is provided to a DIS signal of the Group 3 protocol in a calling party such as the facsimile apparatus 1 and a called party such as the local facsimile apparatus 6. Also, new representations AAA and BBB are provided to the Group 3 protocol, in which AAA represents the E-mail transmission notice to be sent from the calling party and BBB represents the E-mail transmission notice acknowledgment to be sent from the called party.

As shown in FIG. 12, when the user name ABC of the local facsimile apparatus 6 is entered and a call to the local facsimile apparatus 6 is initiated on the facsimile apparatus 1, the local facsimile apparatus 6 receives the call and the line connection is established. Then, the facsimile apparatus 1 and the local facsimile apparatus 6 perform the protocol communications, in which the facsimile apparatus 1 sends AAA and the local facsimile apparatus 6 sends BBB in the B-channel communications. Accordingly, the E-mail related notices are exchanged between the two apparatus.

Figure 13:
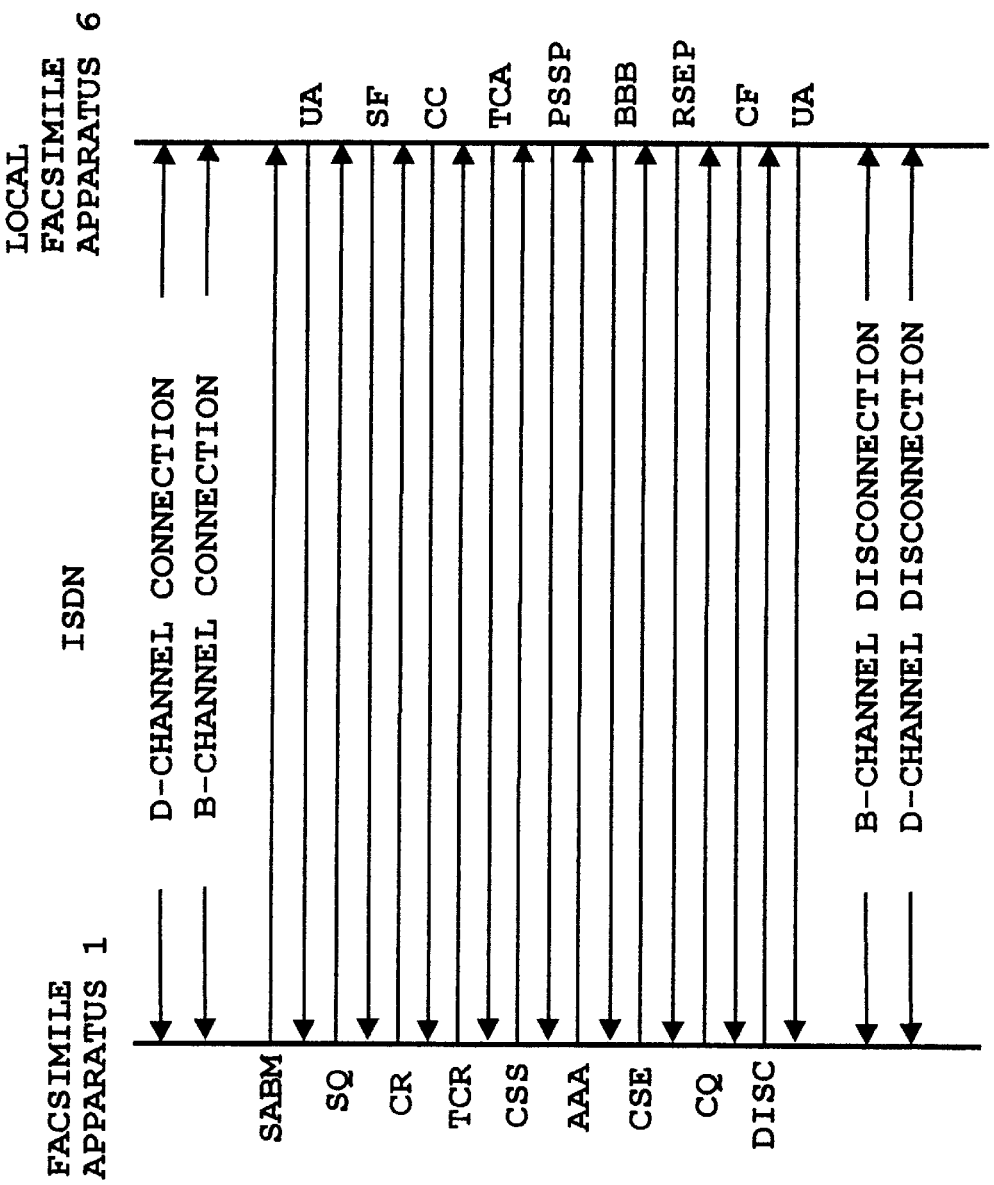
FIG. 13 is an exemplary communications procedure made through a Group 4 facsimile protocol between a local facsimile apparatus and the facsimile apparatus of FIG. 2.

An exemplary E-mail transmission notifying procedure using the Group 4 facsimile protocol via the ISDN is illustrated in FIG. 13. In this example, an indication that represents a capability of notifying statuses of the E-mail transmission and receiving is provided to a CSS and RSSP of the Group 4 protocol in a calling party such as the facsimile apparatus 1 and a called party such as the local facsimile apparatus 6. Also, new representations AAA and BBB are provided to the Group 4 protocol, in which AAA represents the E-mail transmission notice to be sent from the calling party and BBB represents the E-mail transmission notice acknowledgment to be sent from the called party.

As shown in FIG. 13, when the user name ABC of the local facsimile apparatus 6 is entered and a call to the local facsimile apparatus 6 is initiated on the facsimile apparatus 1, the local facsimile apparatus 6 receives the call and the line connection is established. Then, the facsimile apparatus 1 and the local facsimile apparatus 6 perform the protocol communications, in which the facsimile apparatus 1 sends AAA and the local facsimile apparatus 6 sends BBB in the B-channel communications. Accordingly, the E-mail related notices are exchanged between the two apparatus.

This application may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present application may also be implemented by the preparation of application specific integrated circuits or by interconnecting an appropriate network of conventional component circuits, as will be readily apparent to those skilled in the art.

Numerous additional modifications and variations of the present application are possible in light of the above teachings. It is therefore to be understood that within the scope of the appended claims, the present application may be practiced otherwise than as specifically described herein.

This application is based on Japanese Patent application Nos. JPAP09-330437 and JPAP10-168386 filed in the Japanese Patent Office on Dec. 1, 1997 and Jun. 16, 1998, respectively, the entire contents of which are hereby incorporated by reference.

What I claim is:

1. A facsimile apparatus comprising:
   a facsimile image transmitter and receiver that transmits and receives a facsimile image;
   a memory that registers a plurality of facsimile terminals to be called and stores information sets pertinent thereto, each of said information sets including a user name, a facsimile number, and an electronic mail address for an Internet communication;
   an electronic mail generator generating electronic mail that includes an attachment file of image data, said electronic mail being addressed to one of said registered facsimile terminals using said electronic mail address thereof;
   an electronic mail transmitter and receiver that transmits said electronic mail generated by said electronic mail generator to an Internet server of a subscribing Internet service provider and receives electronic mail from the Internet server; and an electronic mail controller that controls said electronic mail transmitter and receiver to transmit electronic mail, addressed to one of said registered facsimile terminals using said electronic mail address of the receiving terminal, to said Internet server and to further transmit an electronic mail transmission notice to said receiving terminal using said facsimile number thereof immediately after said electronic mail transmitter and receiver sends electronic mail to said Internet server.

2. The facsimile apparatus of claim 1, wherein said electronic mail controller controls an access call to said Internet server with said electronic mail transmitter and receiver to receive an incoming electronic mail upon receiving an electronic mail transmission notice notifying transmission of said incoming electronic mail from a different facsimile terminal.

3. The facsimile apparatus of claim 2, wherein said electronic mail controller performs a first try of said access call at a predetermined time after receiving said electronic mail transmission notice, and successive tries at predetermined intervals for up to a number of predetermined times when said incoming electronic mail is not found in said Internet server.

4. The facsimile apparatus of claim 2, wherein said electronic mail controller controls said facsimile image transmitter and receiver to transmit an electronic mail receipt notice to said different facsimile terminal when successfully receiving said incoming electronic mail.

5. The facsimile apparatus of claim 1, further comprising a communications status controller that maintains statuses of each communications operation having been made on basis of information sent back from said one of said registered facsimile terminals and that outputs updated contents of said statuses.

6. The facsimile apparatus of claim 1, further comprising an electronic mail transmission selector that selects either one of image data transmissions by facsimile and by electronic mail, and wherein said electronic mail controller determines a performance of said image data transmission either by facsimile or electronic mail depending upon said electronic mail transmission selector.

7. The facsimile apparatus of claim 1, wherein each of said information sets stored in said memory includes an electronic mail invalidating flag and said electronic mail controller performs said image data transmission by facsimile when said electronic mail invalidating flag corresponding to said one out of said registered facsimile terminals to be called is set.

8. The facsimile apparatus of claim 1, wherein said electronic mail transmitter and receiver transmits and receives said electronic mail through at least one of a public telephone network including at least one of a public switched telephone network and an integrated services digital network, a private line, a local area network and a wide area network.

9. A facsimile apparatus comprising:
transmitting and receiving means for transmitting and receiving a facsimile image;
memory means for registering a plurality of facsimile terminals to be called and storing information sets pertinent thereto, each of said information sets including a user name, a facsimile number, and an electronic mail address for an Internet communication;
electronic mail generating means for generating electronic mail that includes an attachment file of image data, said electronic mail being addressed to one of said registered facsimile terminals using said electronic mail address thereof;
electronic mail transmitting and receiving means for transmitting said electronic mail generated by said electronic mail generating means to an Internet server of a subscribing Internet service provider and for receiving electronic mail from the Internet server; and
electronic mail controlling means for controlling said facsimile image transmitting and receiving means to transmit electronic mail, addressed to one of said registered facsimile terminals using said electronic mail address of the receiving terminal, to said Internet server and to further transmit an electronic mail transmission notice to said receiving terminal using said facsimile number thereof immediately after said electronic mail transmitting and receiving means sends electronic mail to said Internet server.

10. The facsimile apparatus of claim 9, wherein said electronic mail controlling means controls an access call to said Internet server with said electronic mail transmitting and receiving means to receive an incoming electronic mail upon receiving an electronic mail transmission notice notifying transmission of said incoming electronic mail from a different facsimile terminal.

11. The facsimile apparatus of claim 10, wherein said electronic mail controlling means performs a first try of said access call in a predetermined time after receiving said electronic mail transmission notice, and successive tries at predetermined intervals for up to a number of predetermined times when said incoming electronic mail is not found in said Internet server.

12. The facsimile apparatus of claim 10, wherein said electronic mail controlling means controls said facsimile image transmitting and receiving means to transmit an electronic mail receipt notice to said different facsimile terminal when successfully receiving said incoming electronic mail.

13. The facsimile apparatus of claim 9, further comprising communications status controlling means for maintaining statuses of each communications operation having been made on basis of information sent back from said one of said registered facsimile terminals and that outputs updated contents of said statuses.

14. The facsimile apparatus of claim 9, further comprising electronic mail transmission selecting means for selecting either one of image data transmissions by facsimile and by electronic mail, and wherein said electronic mail controlling means determines a performance of said image data transmission either by facsimile or electronic mail depending upon said electronic mail transmission selecting means.

15. The facsimile apparatus of claim 9, wherein each of said information sets stored in said memory means includes an electronic mail invalidating flag and said electronic mail controlling means performs said image data transmission by facsimile when said electronic mail invalidating flag corresponding to said one out of said registered facsimile terminals to be called is set.

16. The facsimile apparatus of claim 9, wherein said electronic mail transmitter and receiver transmits and receives the electronic mail through at least one of a public telephone network including at least one of a public switched telephone network and an integrated services digital network, a private line, a local area network and a wide area network.

17. A method for a facsimile apparatus to notify a called facsimile terminal of an electronic mail transmission comprising the steps of:

providing a facsimile image transmitter and receiver which transmits and receives a facsimile image;

registering a plurality of facsimile terminals to be called by storing information sets pertinent thereto, each of said information sets including a user name, a facsimile number, and an electronic mail address for an Internet communication;

generating an electronic mail that includes an attachment file of image data, said electronic mail being addressed to one of said registered facsimile terminals using said electronic mail address thereof;

providing an electronic mail transmitter and receiver that transmits said electronic mail generated by said generating step to an Internet server of a subscribing Internet service provider and for receiving electronic mail from the Internet server; and first controlling said facsimile image transmitter and receiver to transmit electronic mail, addressed to one of said registered facsimile terminals using said electronic mail address of the receiving terminal, to said Internet server and to further transmit an electronic mail transmission notice to said receiving terminal using said facsimile number thereof immediately after said electronic mail transmitter and receiver sends electronic mail to said Internet server.

18. The method of claim 17, wherein said first controlling step controls an access call to said Internet server with said electronic mail transmitter and receiver to receive an incoming electronic mail upon receiving an electronic mail transmission notice notifying transmission of said incoming electronic mail from a different facsimile terminal.

19. The method of claim 18, wherein said first controlling step performs a first try of said access call a predetermined time after receiving said electronic mail transmission notice, and successive tries at predetermined intervals for up to a number of predetermined times when said incoming electronic mail is not found in said Internet server.

20. The method of claim 18, wherein said first controlling step controls said facsimile image transmitter and receiver to transmit an electronic mail receipt notice to said different facsimile terminal when successfully receiving said incoming electronic mail.

21. The method of claim 17, further comprising a second controlling step for maintaining statuses of each communications operation having been made on basis of information sent back from said one of said registered facsimile terminals and that outputs updated contents of said statuses.

22. The method of claim 17, further comprising a selecting step for selecting either one of image data transmissions by facsimile and by electronic mail, and wherein said first controlling step determines a performance of said image data transmission either by facsimile or electronic mail depending upon said electronic selecting step.

23. The method of claim 17, wherein each of said information sets stored in said storing step includes an electronic mail invalidating flag and said first controlling step performs said image data transmission by facsimile when said electronic mail invalidating flag corresponding to said one out of said registered facsimile terminals to be called is set.

24. The method of claim 17, wherein said electronic mail is transmitted and received through at least one of a public telephone network including at least one of a public switched telephone network and an integrated services digital network, a private line, a local area network and a wide area network.

25. An electronic communications system, comprising:

at least two facsimile apparatus which are electronically coupled to each other, each comprising:

a facsimile image transmitter and receiver that transmits and receives a facsimile image;

a memory that registers a plurality of facsimile terminals to be called, including the other one of said at least two facsimile apparatus, and stores information sets pertinent thereto, each of said information sets including a user name, a facsimile number, and an electronic mail address for an Internet communication;

an electronic mail generator generating electronic mail that includes an attachment file of image data, said electronic mail being addressed to one of said registered facsimile terminals using said electronic mail address thereof;

an electronic mail transmitter and receiver that transmits said electronic mail generated by said electronic mail generator to an Internet server of a subscribing Internet service provider and receives electronic mail from the Internet server; and an electronic mail controller that controls said facsimile image transmitter and receiver to transmit electronic mail, addressed to one of said registered facsimile terminals using said electronic mail address of the receiving terminal, to said Internet server and to further transmit an electronic mail transmission notice to said receiving terminal using said facsimile number thereof immediately after said electronic mail transmitter and receiver sends electronic mail to said Internet server.

26. A communication system for transmitting and receiving information via a facsimile information communication system and an Internet, comprising:

an electronic mail generator and transmitter that generates and transmits electronic mail including an attachment file of image data to a communication terminal via the Internet; and a facsimile information communication system controller for controlling said electronic mail generator and transmitter to transmit electronic mail, addressed to a receiving communication terminal using an electronic mail address of the receiving communication terminal server, and to further transmit an electronic mail transmission notice to said receiving communication terminal to which the electronic mail including the attachment file of image data is addressed, via the facsimile information communication system using said facsimile number of the receiving communication terminal immediately after said electronic mail is sent, the electronic mail transmission notice indicating to the receiving communication terminal to which the electronic mail is addressed, that an e-mail has been forwarded thereto.

27. A communication system as recited in claim 26, wherein the communication apparatus comprises a facsimile device.

28. A communication system as recited in claim 26, wherein the facsimile information communication system comprises a public telephone network.

29. A communication system as recited in claim 28, wherein said public telephone network comprises an Integrated Services Digital Network.

30. A communication system as recited in claim 26, wherein the electronic mail generator and transmitter transmits the electronic mail including the attachment file of image data to a first Internet service provider.

31. A communication system for transmitting and receiving information via a facsimile information communication system and an Internet, comprising:

an electronic mail generator and transmitter that generates and transmits electronic mail including an attachment file of image data to a communication terminal via the Internet, wherein the electronic mail generator and transmitter transmits the electronic mail including the attachment file of image data to a first Internet service provider;

a facsimile information communication system controller for transmitting to a receiving communication terminal to which the electronic mail including the attachment file of image data is addressed, via the facsimile information communication system, a notice indicating to the receiving communication terminal to which the electronic mail is addressed, that an e-mail has been forwarded thereto; and a second Internet service provider, wherein the first Internet service provider transmits the electronic mail including the attachment file of image data to the second Internet service provider, and wherein the communication terminal attempts to access and retrieve the electronic mail including the attachment file of image data from the second service provider in response to receiving the notice.

32. A communication system as recited in claim 31, wherein the first service provider and the second service provider comprise different service providers.

33. A communication system as recited in claim 31, wherein the first service provider and the second service provider comprise the same service provider.

34. A communication system as recited in claim 26, further comprising a facsimile image data generator, wherein the attachment file comprises facsimile image data generated by the facsimile image data generator.

35. A method of transmitting and receiving information via a facsimile information communication system and an Internet, comprising:

providing an electronic mail transmitter to transmit electronic mail including an attachment file of image data, to a communication terminal via the Internet; and controlling said facsimile image transmitter to transmit electronic mail, addressed to a receiving communication terminal using an electronic mail address of the receiving communication terminal, and to further transmit an electronic mail transmission notice to said receiving communication terminal to which the electronic mail including the attachment file of image data is addressed via the public telephone network using said facsimile number of the receiving communication terminal immediately after said electronic mail transmitter and receiver sends the electronic mail, the notice indicating to the receiving communication terminal to which the electronic mail is addressed, that an e-mail has been forwarded thereto.

36. A method as recited in claim 35, wherein the electronic mail generating and transmitting step transmits the electronic mail including the attachment file of image data to a first Internet service provider.

37. A method of transmitting and receiving information via a facsimile information communication system and an Internet, comprising:

generating and transmitting electronic mail including an attachment file of image data, to a communication terminal via the Internet, wherein the electronic mail generating and transmitting step transmits the electronic mail including the attachment file of image data to a first Internet service provider; and transmitting to a receiving communication terminal to which the electronic mail including the attachment file of image data is addressed via the public telephone network, the notice indicating to the receiving communication terminal to which the electronic mail is addressed, that an e-mail has been forwarded thereto, wherein the first Internet service provider transmits the electronic mail including the attachment file of image data to a second Internet service provider, and wherein the communication terminal attempts to access and retrieve the electronic mail including the attachment file of image data from the second service provider in response to receiving the notice.

38. A facsimile apparatus as recited in claim 1, wherein a recipient that the electronic mail transmission notice is sent to at the registered facsimile terminal using said facsimile number is a same recipient to which the electronic mail is sent to at the registered facsimile terminal using said electronic mail address.

39. A facsimile apparatus as recited in claim 9, wherein a recipient that the electronic mail transmission notice is sent to at the registered facsimile terminal using said facsimile number is a same recipient to which the electronic mail is sent to at the registered facsimile terminal using said electronic mail address.

40. A method for a facsimile apparatus as recited in claim 17, wherein a recipient that the electronic mail transmission notice is sent to at the registered facsimile terminal using said facsimile number is a same recipient to which the electronic mail is sent to at the registered facsimile terminal using said electronic mail address.

41. An electronic communication system as recited in claim 25, wherein a recipient that the electronic mail transmission notice is sent to at the registered facsimile terminal using said facsimile number is a same recipient to which the electronic mail is sent to at the registered facsimile terminal using said electronic mail address.

42. A communication system as recited in claim 26, wherein a recipient that the notice is sent to is a same recipient to which the electronic mail is sent.

43. A method as recited in claim 35, wherein a recipient that the notice is sent to is a same recipient to which the electronic mail is sent.

* * * * *